(12) United States Patent
Comsa

(10) Patent No.: US 8,753,507 B2
(45) Date of Patent: Jun. 17, 2014

(54) ARTIFICIAL OIL LIFTING UNIT USING ABSORBENT BELTS

(76) Inventor: Vasile Comsa, Bucharest (RO)

( * ) Notice: Subject to any disclaimer, the term of this patent is extended or adjusted under 35 U.S.C. 154(b) by 292 days.

(21) Appl. No.: 13/130,251

(22) PCT Filed: Sep. 23, 2009

(86) PCT No.: PCT/IB2009/007094
§ 371 (c)(1),
(2), (4) Date: Jun. 14, 2011

(87) PCT Pub. No.: WO2010/061252
PCT Pub. Date: Jun. 3, 2010

(65) Prior Publication Data
US 2011/0232894 A1    Sep. 29, 2011

(30) Foreign Application Priority Data

Nov. 25, 2008   (RO) .................................... A/00929

(51) Int. Cl.
*E21B 43/12*  (2006.01)
*B09C 1/00*   (2006.01)
*C02F 1/40*   (2006.01)
*E02B 15/10*  (2006.01)

(52) U.S. Cl.
CPC ............... *E21B 43/121* (2013.01); *B09C 1/002* (2013.01); *E02B 15/104* (2013.01); *C02F 1/40* (2013.01)
USPC ................. 210/170.01; 210/170.07; 210/526; 166/68.5; 166/72; 166/369; 198/643

(58) Field of Classification Search
USPC ......... 210/170.01, 170.07, 242.3, 242.4, 400, 210/401, 526, 923, 924; 166/67, 68.5, 72, 166/369; 198/643
See application file for complete search history.

(56) References Cited

U.S. PATENT DOCUMENTS

| | | | | |
|---|---|---|---|---|
| 3,508,663 A | * | 4/1970 | Brill .............................. | 210/400 |
| 3,695,451 A | * | 10/1972 | Schmidt et al. ............... | 210/526 |
| 4,552,220 A | | 11/1985 | Jones | |
| 4,582,604 A | * | 4/1986 | Bashaw ........................ | 210/400 |
| 4,652,372 A | * | 3/1987 | Threadgill ................. | 210/242.3 |
| 4,683,946 A | | 8/1987 | Jones | |

(Continued)

FOREIGN PATENT DOCUMENTS

| RO | 112377 B | 8/1997 |
|---|---|---|
| RO | 121995 B1 | 10/2008 |
| RO | 125468 B1 | 8/2010 |

OTHER PUBLICATIONS

International Search Report of PCT/182009/007094 dated Jul. 14, 2010.

*Primary Examiner* — Christopher Upton
(74) *Attorney, Agent, or Firm* — Sughrue Mion, PLLC

(57) ABSTRACT

An artificial oil lifting unit uses an endless olephilic absorbent belt, driven by a surface equipment and tensed by a down hole equipment placed in the well production casing. The said absorbent belt (1) is looped over a central pulley (2) from a driving and collecting module (C) and driven by a double toothed belt (4) looped over six pulleys from which five are free (6,7,8,9 and 10). One is a driving pulley (5) placed over an entry shaft (36), the double toothed belt (4) being looped also over the oil absorbent belt on the central pulley and tensed with two identical systems (I) with pulleys commanded from the exterior of the case (13).

22 Claims, 12 Drawing Sheets

(56) References Cited

U.S. PATENT DOCUMENTS

| | | | |
|---|---|---|---|
| 4,876,011 A * | 10/1989 | Betts et al. | 210/526 |
| 5,016,708 A | 5/1991 | Baer et al. | |
| 5,062,953 A * | 11/1991 | Lewan | 210/242.4 |
| 5,080,781 A * | 1/1992 | Evins, IV | 210/170.07 |
| 5,259,958 A | 11/1993 | Bronnec et al. | |
| 5,378,371 A | 1/1995 | Hobson | |
| 5,643,449 A | 7/1997 | Brinkley | |
| 5,645,733 A * | 7/1997 | Hobson | 210/526 |
| 5,794,698 A | 8/1998 | Roberts | |
| 5,928,520 A * | 7/1999 | Haumesser | 210/170.07 |
| 2004/0194952 A1* | 10/2004 | Maiolo | 166/67 |
| 2008/0047705 A1* | 2/2008 | Vaello | 166/369 |

* cited by examiner

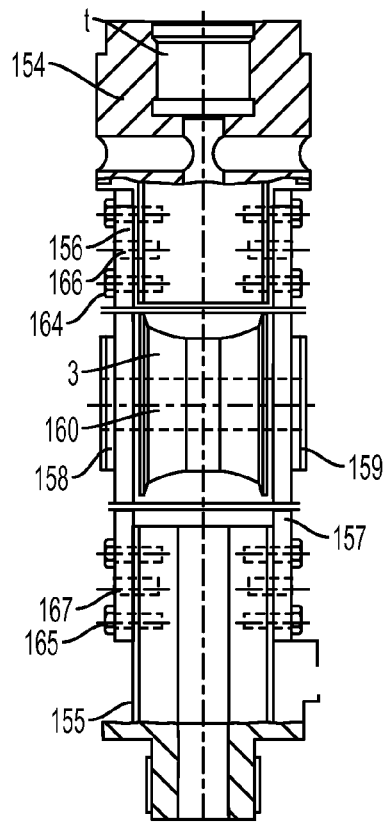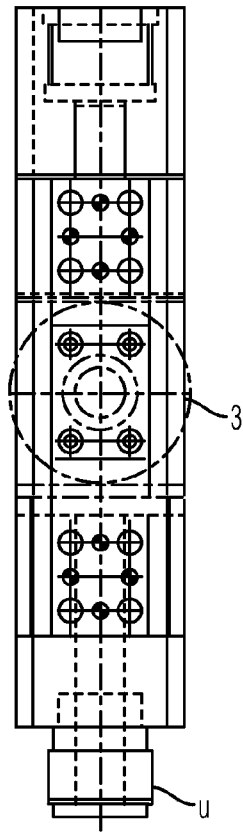
FIG. 15    FIG. 16
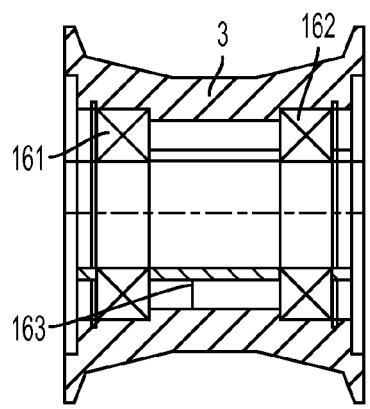
FIG. 17

US 8,753,507 B2

ARTIFICIAL OIL LIFTING UNIT USING ABSORBENT BELTS

CROSS REFERENCE TO RELATED APPLICATIONS

This application is a National Stage Entry of International Application No. PCT/IB2009/007094 filed Sep. 23, 2009 claiming priority from Romanian Patent Application No. A/00929 filed Nov. 25, 2008, the contents of both of which are incorporated herein by reference in their entirety.

FIELD OF THE INVENTION

The invention relates to an artificial oil lifting (with or without gas) unit from an oil well, using an absorbent belt made up from absorbent oleophilic materials, which moves permanently between two points, one being at the surface and the other being in the well production casing, under the oil dynamic level.

BACKGROUND

There is known an unit whose continuous flexible element (belt), of square or circular cross-section, is looped several times on a driving pulley. There are also known other two units, one whose continuous flexible element (belt) is driven between two special profile cogwheels, one providing torque and the other being used to press the belt on the torque providing cogwheel, and the second unit, whose continuous flexible element is looped over a torque providing cogwheel and pressed on this cogwheel by a cog chain whose cogs match the ones of the cogwheel.

The disadvantages of these units are related specially to the low efficiency of the driving system of the continuous flexible element (absorbent belt), limiting their application to shallow wells (for the first unit) and to the excessive mechanical stress which led to premature belt wear resulting in shortened belt lifetime (for the second type units). A major technical disadvantage, common to both types, is that the units produce the oil in storage tanks placed at the well site, oil which is subsequently transported with tankers to the oil gathering centers.

The artificial oil lifting using absorbent belts, made according to the present invention, eliminates all these disadvantages as the new, very efficient, absorbent belt driving system allows the oil lifting (with or without gas) from shallow to very deep wells and the oil is pumped directly to the oil gathering center by the special design oil transfer pump the unit is provided with.

SUMMARY OF THE INVENTION

The artificial oil lifting from a well using absorbent belt, according to the present invention, is made of three parts—the surface equipment, the down hole equipment and the continous and oleophilic element (the absorbent belt). The surface equipment has the function to drive the absorbent belt in a permanent vertical move between two points, one situated in the well production casing, under the dynamic level, and the second at the surface, in the unit case.

The surface equipment has also the function of collecting the oil brought at the surface by the absorbent belt, as well as the oil transport to the oil gathering center.

The down hole equipment has the function to permanently keep tensed both branches (ascending and descending) of the absorbent belt, as well as to prevent the accidental twist of those branches during the operation of running and fixing the down hole equipment in the well production casing or during the unit operation.

The continous and flexible element (the absorbent belt) makes the technological connection between the surface equipment and the down hole equipment. Through its special construction and by the nature of the component materials, the absorbent belt ensures a certain transport capacity for the oil and water emulsion, thus ensuring a considerable crude oil flow rate, according to the production capacity of the oil reservoir and the decision of the oilfield operator.

Hereinafter is presented an embodiment of the present invention in relation to the drawings (FIG. 1-19). Other advantages of the present invention will be disclosed in reference with the description and the drawings.

BRIEF DESCRIPTION OF THE DRAWINGS

FIG. 1-19

Figure 1:
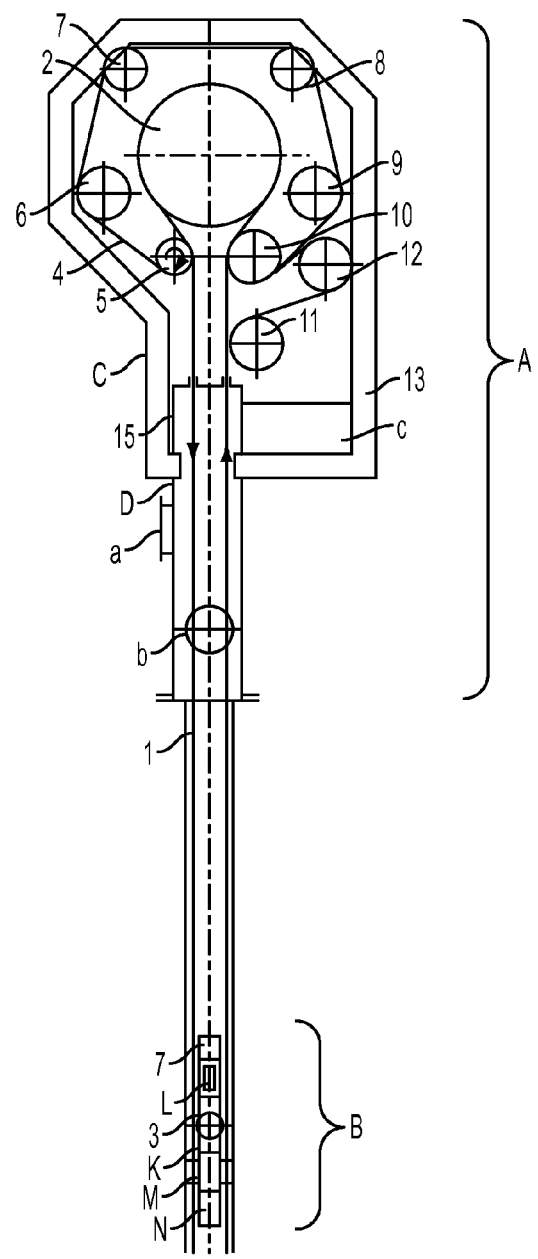
Figure 2:
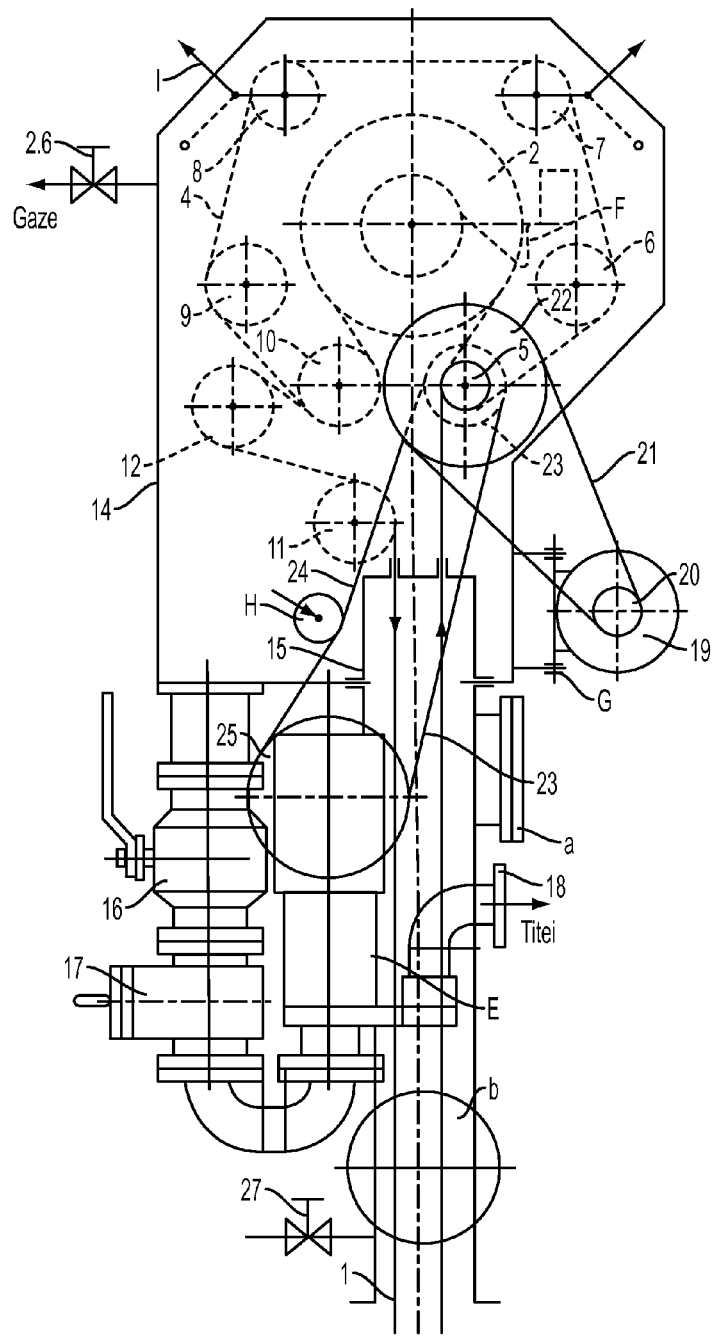

Reference will be now made to the accompanying drawings in which:

FIG. 1 is the general layout of the artificial oil lifting unit using absorbent belt FIG. 2 is the layout of the surface equipment of the artificial oil lifting unit presented in FIG. 1

Figure 3:
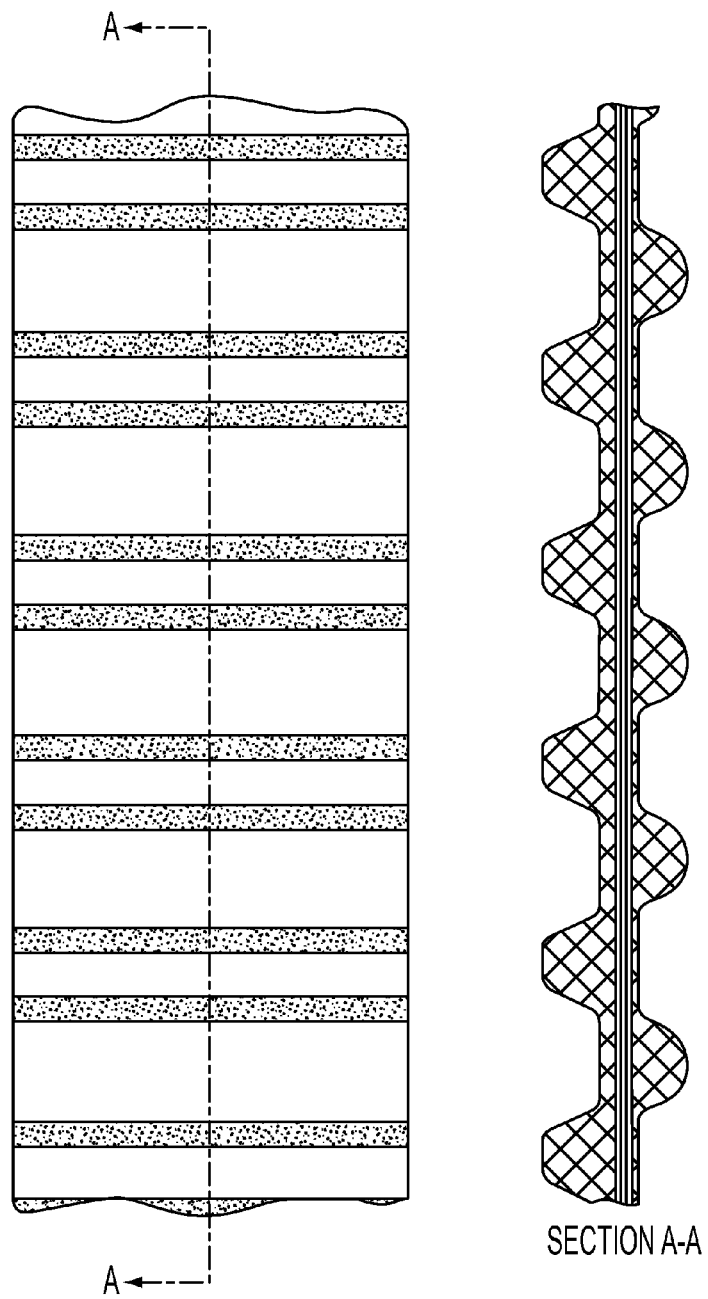
Figure 4:
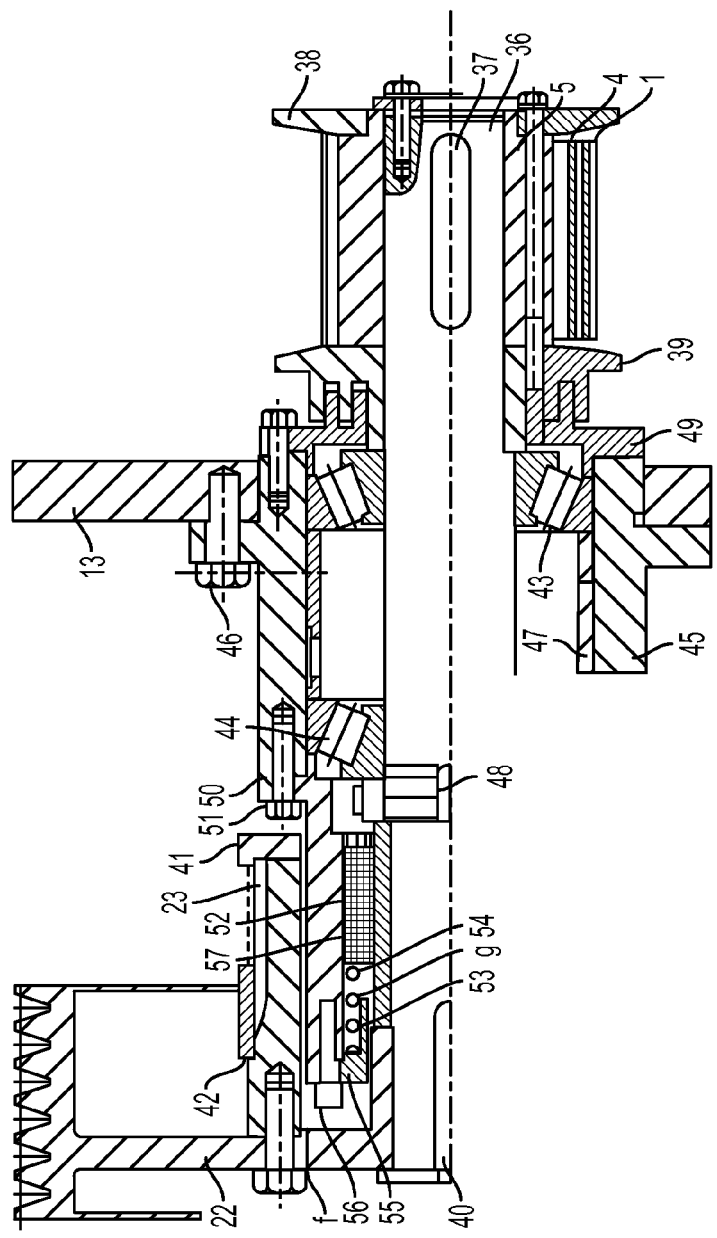
Figure 5:
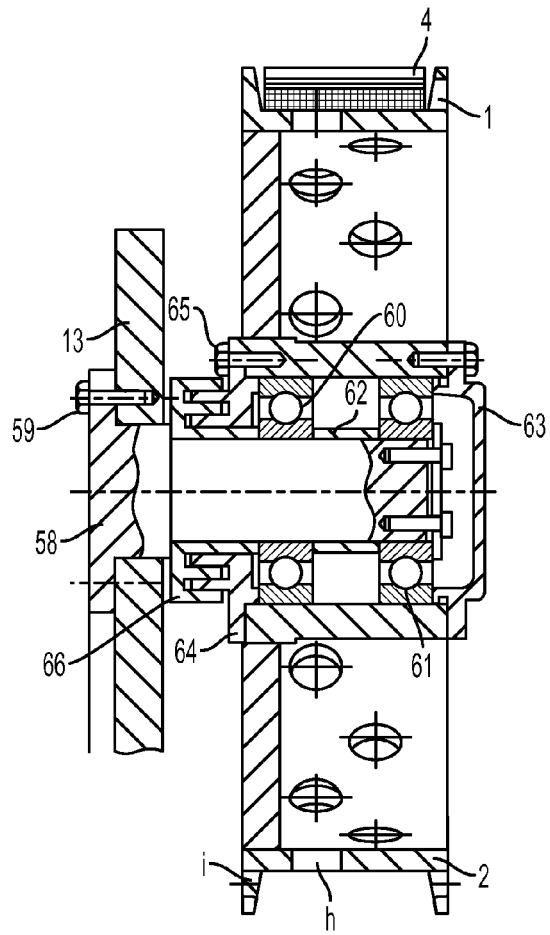
Figure 6:
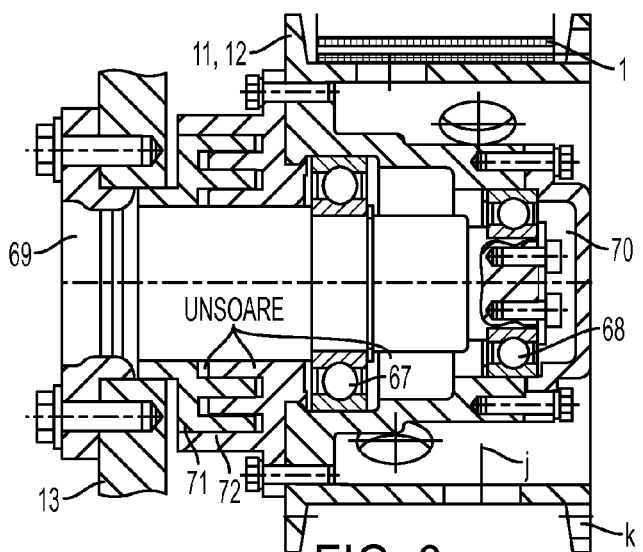

FIG. 3 is the longitudinal profile of the double toothed belt used to drive the oil absorbent belt FIG. 4 is a longitudinal section of the double toothed belt driveshaft FIG. 5 is a cross section of the oil absorbent belt central pulley FIG. 6 is a cross section of a free pulley (absorbent belt sweeping pulley)

Figure 7:
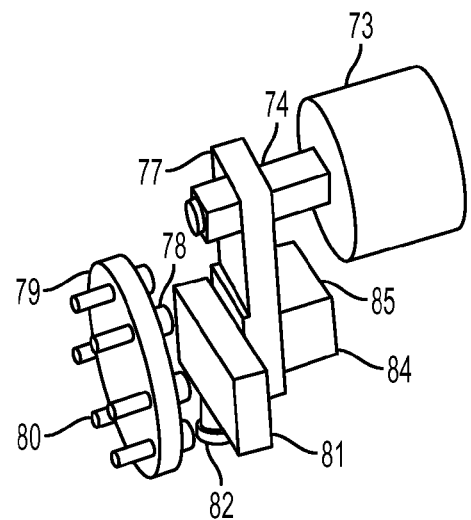
Figure 8:
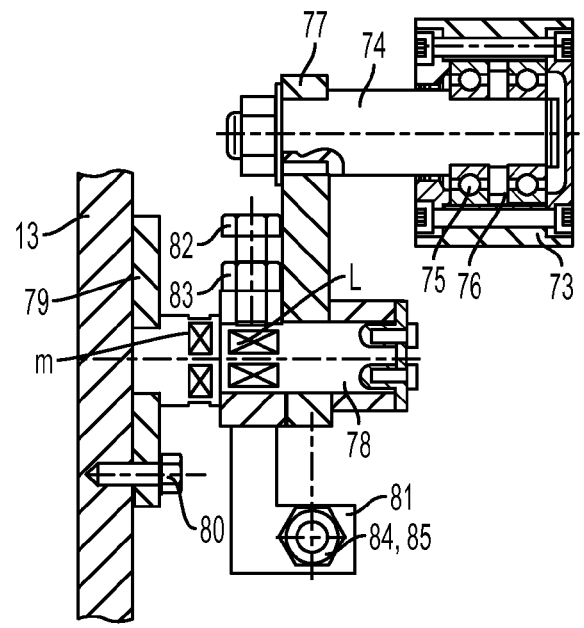
Figure 9:
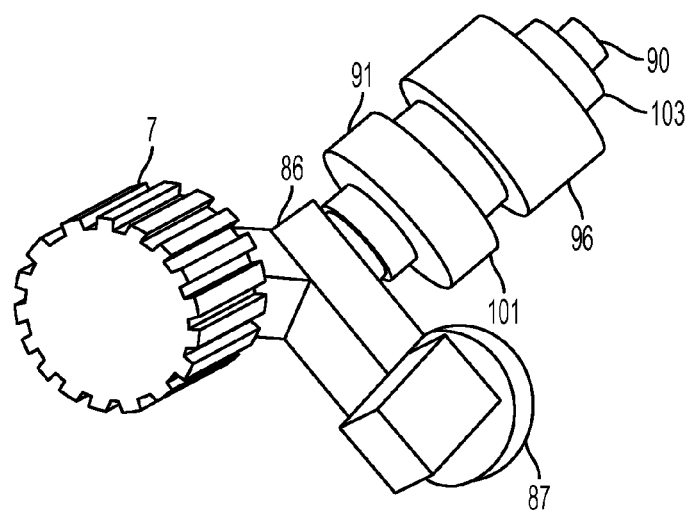
Figure 10:
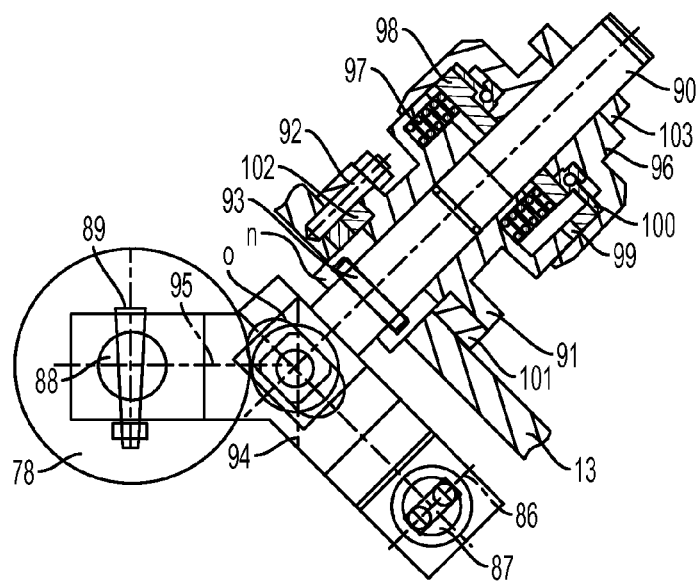
Figure 11:
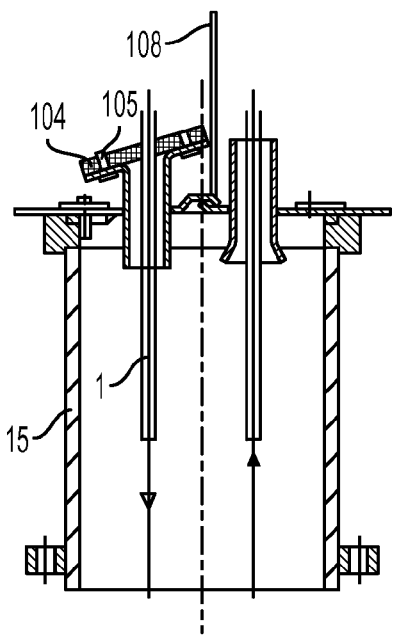
Figure 12:
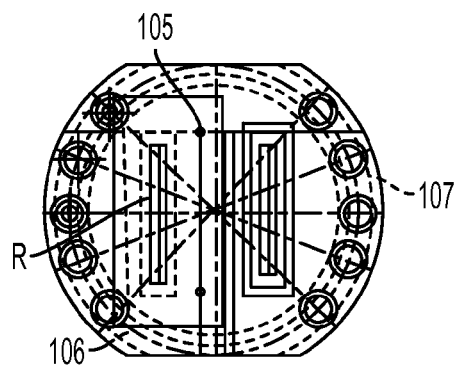

FIG. 7 is an isometric view of the double-toothed belt tension-adjustment device FIG. 8 is a section of the double-toothed belt tension-adjustment device FIG. 9 is an isometric view of the tension-adjustment device of the oil transfer pump drive belt FIG. 10 is a section through the tension-adjustment device of the oil transfer pump drive belt FIG. 11 is a section of the oil non-return device FIG. 12 is a planar view of the oil non-return device shown in FIG. 11

Figure 13:
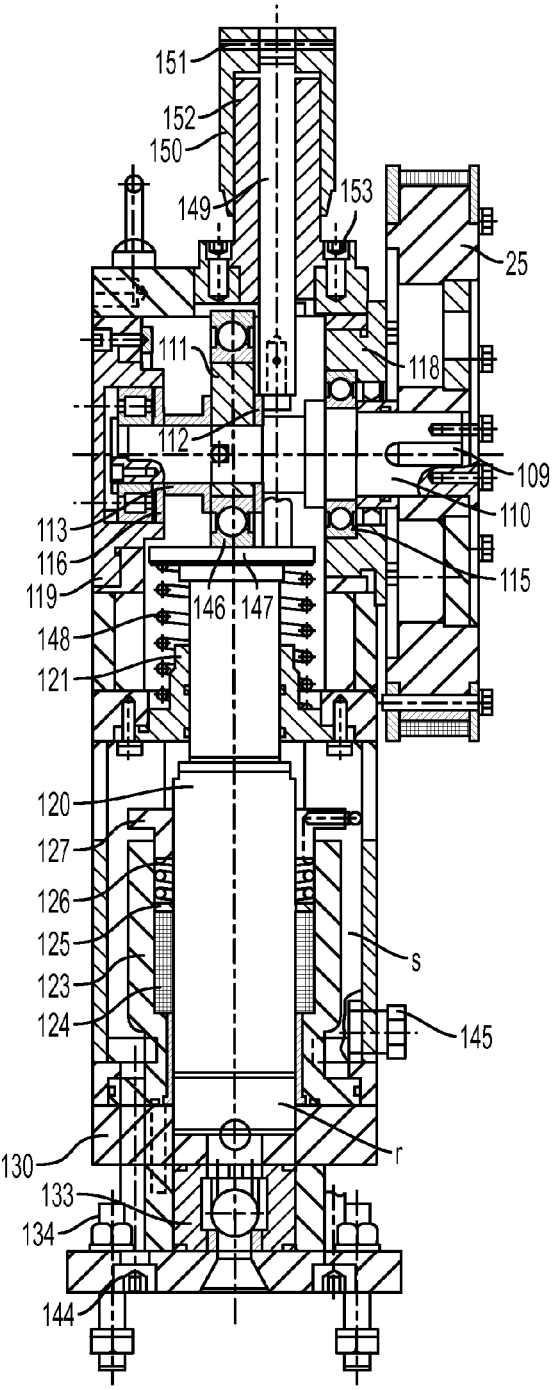
Figure 14:
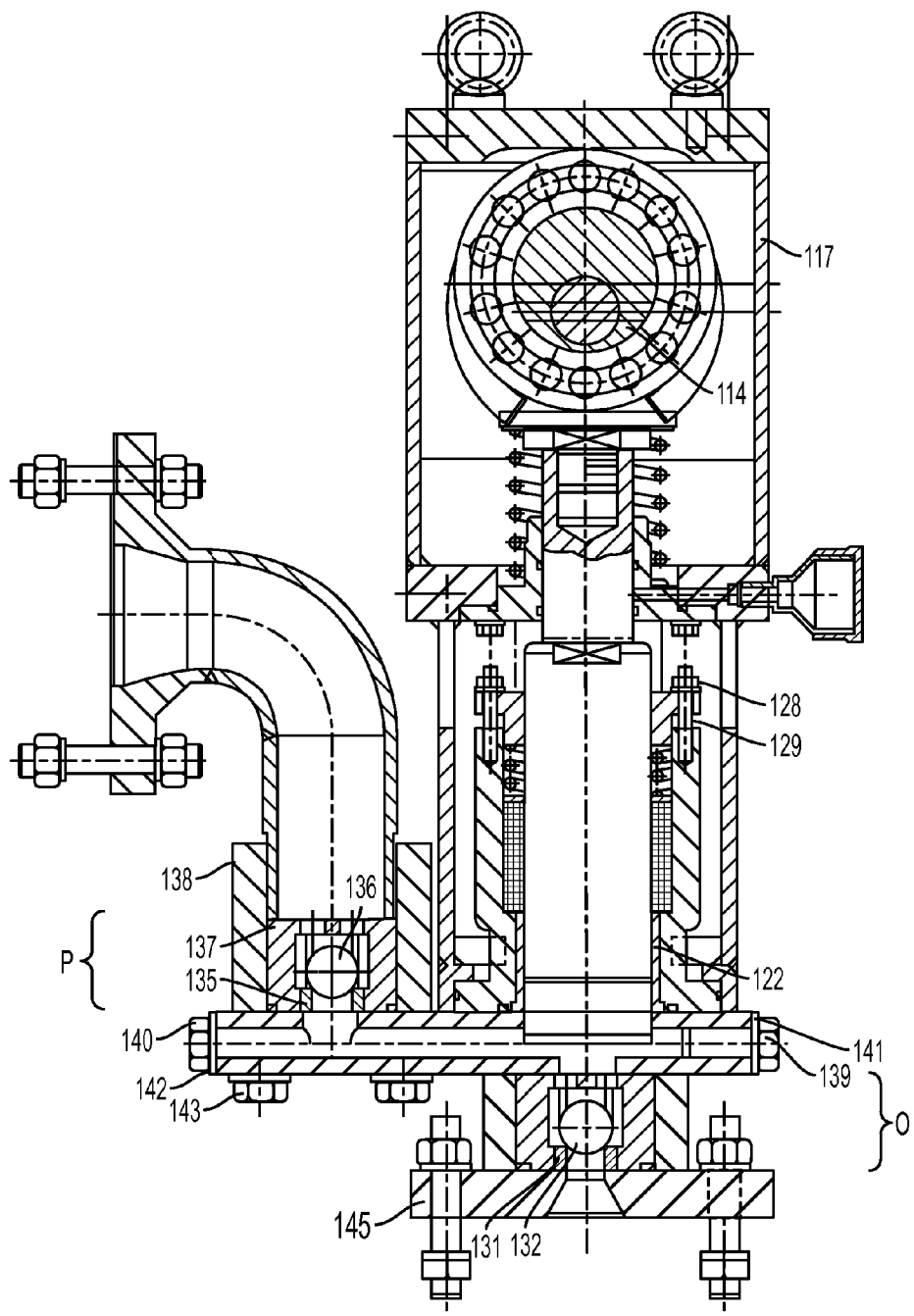

FIG. 13 is an longitudinal section of the oil transfer pump and longitudinal section of the pump drive shaft FIG. 14 is an longitudinal section of the oil transfer pump and transverse section of the pump drive shaft FIG. 15 is a frontal view of the oil absorbent belt bottom pulley module which is a part of the down hole equipment (in the well)

FIG. 16 is a lateral view of the module shown in FIG. 15

FIG. 17 is a section of the bottom pulley of the module shown in FIG. 15

Figure 18:
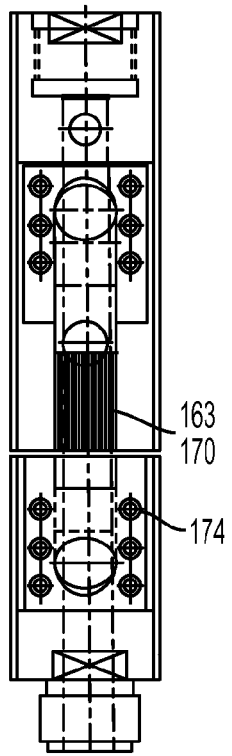

FIG. 18 is a view of the expandable pads module

Figure 19:
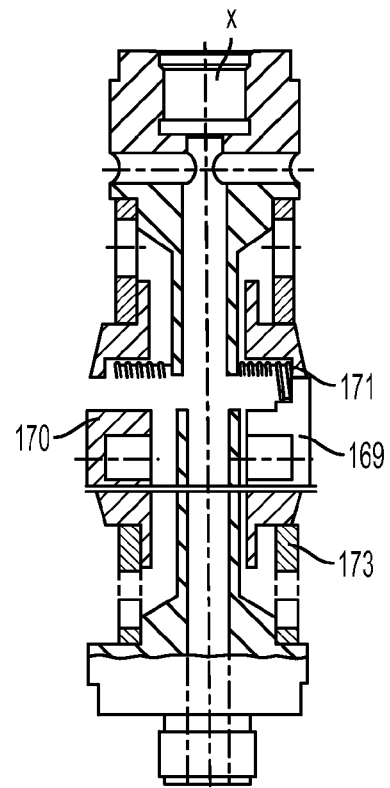

FIG. 19 is a longitudinal section of the expandable pads module

DETAILED DESCRIPTION OF THE INVENTION

The invention relates to an artificial oil lifting unit using absorbent belts as detailed below, made out of a surface equipment, marked "A" in FIG. 1, a down hole equipment "B" and an endless absorbent belt, 1, looped over the surface equipment central pulley, 2, and over a bottom pulley, 3, which is a part of the down hole equipment. In its continuous movement, while immersed in oil within the production casing below the oil dynamic level, the absorbent belt, 1, is filled with oil, oil which is transported to the surface on the belt ascending branch 1. The surface equipment "A" is composed of two modules, one marked "C" which drives the oil absorbent belt, 1, and sweeps the oil from the belt and the second module, marked "D" from which the oil absorbent belt is adjusted on its length in the production casing and from which the swept and collected oil is pumped through a pipe to the oil gathering center.

The module "C" is provided with a special double toothed belt, 4, which is looped over the central pulley and over six other pulleys from which one, 5, is a driving pulley and the others, 6,7,8,9 and 10, are free pulleys.

Within the module "C", the oil absorbent belt, 1, is looped over the free pulleys, 11,12 and 10, and then over the central pulley, 2, and over the driving pulley, 5. Over the pulleys, 10, 2 and 5, the double toothed belt, 4, and the oil absorbent belt, 1, have a common path and are moving at the same speed, the double toothed belt, 4, driving and moving the oil absorbent belt, 1 on the same path. Over the central pulley, 2, the oil absorbent belt, 1, is pressed, on its outer side, by the double toothed belt, 4, and also over the driving pulley, 5, and over the free wheel, 10, the absorbent belt, 1, is pressed on its outer side by the double toothed belt.

The adjustment-and-pumping module "D" is provided with two windows "a" and "b" and over the window "a" is mounted and fixed the device which adjusts the length of the absorbent belt in the production casing and through the window "b" is mounted the device which blocks both branches (ascending and descending) of the absorbent belt when the technological operation process requires this action.

On the module "D" is fixed the pump "E" (FIG. 2) which sucks the oil from the unit case and pumps it to the oil gathering and stocking center. The intake pipe of the pump "E" is provided with a valve, 16, and a filter, 17. The pump "E" pumps the oil through the discharge pipe, 18.

The unit is driven by the electromotor, 19, the pulley, 20, mounted on the electromotor driveshaft, 19, the transmission belts, 21, the pulley, 22, and the driving pulley, 5, and through this pulley, by the double toothed belt, 4, which drives the oil absorbent belt, 1. The pulley, 22, is fixed, through the spindle of the pulley, 5, to the pulley, 23, which, through the transmission belt, 24, and the pulley, 25, drives the pump "E".

The double toothed belt, 4, is tensed through two identical devices "I" which adjust the position of the free pulleys, 7 and 8. In order to be used to the artificial lifting of oil with associated gas, the unit is provided with appropriate gaskets and the gas evacuation is performed through the valve, 26. The valve, 27, is used to fill in nitrogen in order to displace the gas from the well with this inert gas, before opening the unit door during maintenance and repair.

The down hole equipment "B" is composed of several modules, thread assembled, respectively: a handling module "J" which has a double function one being the handling of the down hole equipment at the surface and the second being to fish the piece of the down hole equipment in the case the absorbent belt breaks and falls in the production casing, two modules "L" and "M" provided with expandable pads for keeping the down hole equipment fixed and centered in the well's production casing, a module "K" provided with the bottom pulley, a one or more counterweight modules "N" (depending upon the situation met at the well), a module "P" provided with four blades placed parallel to the module's symmetry axis, blades which have the function to stabilize the position of the down hole equipment as they prevent any twist tendency of the branches (ascending and descending) of the absorbent belt, 1, when the down hole equipment is submerged in fluid and, filially, a guiding module "Q".

The driving belt, 4, has a special profile (FIG. 3) as the profile is a double toothed one as the teeth from one side are geared with the six pulleys, 5,6,7,8,9 and 10, over the double toothed belt is looped, the pulley, 5, being the driving pulley, the other five being driven. The teeth from the other side of the double timing belt, 4, come in contact with the absorbent belt while the absorbent belt is looped over the central pulley, 2, and the neighboring pulleys, 5 and 10. The teeth of the double toothed belt, have a special profile on both sides, which enables both the driving of the belt, 4, by the driving pulley, 5, and the driving of the absorbent belt, 1, with no physical aggression and wear.

The driving pulley, 5, (FIG. 4) which drives the belt, 4, and, through this belt drives the absorbent belt, 1, is a toothed wheel with special teeth and is fixed on the shaft, 36, through the key, 37. The pulley, 5, is set between the disks 38, and, 39, which guide the belt, 4, and the absorbent belt, 1, on the pulley axis.

On the shaft, 36, there is placed also the pulley, 22, which has trapezoidal cuttings for the transmission belts, 21, to be looped over, and the key, 40, which fixes the pulley, 22, on the shaft, 36. Over a shoulder "f" of the pulley, 22, there is centered the wheel, 23, which is bordered by the disk, 41, and the ring, 42. The shaft, 36, goes through the case, 13, and is underpinned on the roll bearings, 43, and, 44, in the bearing, 45, fixed on the case with the screws, 46. The roll bearings, 43, and, 44, are separated by the liner, 47, and fixed on the axis by the connecting nut, 48 and the baffle plate, 49, and the sleeve, 50, fixed on the body, 45, between the baffle plate and the sleeve, 50, fixed on the body, 45 with the screws, 51.

The chamber of the roll bearings, 44, and, 43, is sealed and protected in order to avoid contact with the crude oil (which contains water, sand, marl etc). The inner protection is given by the baffle made by the disk, 39, and the cover, 49. The outer protection of the chamber of the bearings, 44 and 43, is given by several soft rings, 52, pressed on the spring, 53, through the washer, 54. In the sleeve, 50, the spring chamber is set by the cover, 55, fixed with the screws, 56. The cover, 55, is provided with a shoulder "g" which, if a sudden pressure increase occurs in the case, makes the sealing rings, 52, and the washer, 54, to press further the spring, 53, fact which increases the protection efficiency of the rings, 52, on the hub, 57.

The central pulley (FIG. 5) is fixed on a shaft, 58, which is fixed in the wall of the case, 13, with the screws, 59. The pulley lays on two roll bearings, 60, and 61, separated by the liner, 62. The chamber of these bearings is sealed with a cover, 63, and protected, against the intrusion of the dirty crude oil, through the baffle of the cover, 64, fixed on the pulley, 2, with the screws, 65, and the ring, 66, fixed on the shaft, 58. The central pulley, 2, has guiding rims for the absorbent belt, 1, and the double toothed belt, 4. The central pulley has radial holes "h" and lateral holes "i" for the quick expulsion of the oil swept from the absorbent belt, 1. The free pulleys, 11, and 12, (FIG. 6) have a construction similar to the central pulley, 2, adapted to their lower diameter and to the fact that over them is looped exclusively the absorbent belt, 1. Every such pulley sits on two roll bearings, 67, and, 68, placed on the shaft, 69, which is fixed on the case, 13. The sealing in made by the cover, 70 and the baffle of the ring, 71, and the cover, 72. The lubrication of the roll bearings, 67, and, 68 is made with appropriate grease type. In order to recuperate the oil swept from the absorbent belt, there have been bored the radial holes "j" and the lateral holes "k".

The tension system "H" for the belt, 24 (FIGS. 7 and 8) is made of the pulley, 73, which sits on the shaft, 74, on two roll bearings, 75, separated by the ring, 76, the arm, 77, articulated on the bolt, 78, fixed on the flange, 79, on the case, 13, with the screws, 80, and the pressing arm, 81, which is fixed on the shaft, 78, with the screw, 82, and the blocking nut, 83, on one of the flattenings "I" which are situated in an area not reached by the arm, 81. The tension of the belt, 24, is made by pushing the arm, 77, with the screw, 84, and the nut, 85.

The tension system "I" for the double toothed belt, 4, (FIGS. 9 and 10) is made out of an arm, 86, articulated at one end on the bolt, 87, fixed on the case, 13, and, at the other end, is provided with the pulley, 7, rolling on a bearing on the shaft, 88, fixed with a pin, 89, and the middle of the arm, 86, is carried by the threaded rod, 90, which slides in the box, 91, fixed on the case, 13, with the studs, 92. The threaded rod, 90, can slide by rotating the bell, 96, elastically connected to the case, 91, through the springs, 97, the disk, 98, driven by the pin, 99, and the roll bearing, 100. The deformation of the springs, 97, is the result of the force applied on the threaded rod, 86, and, respectively, in the pulley, 7. In order to increase the stroke of the threaded rod, 86, it can be used a disk, 101, sealed with soft rings, 102, and placed between the box, 91, and the case, 13. After adjusting the tension of the double toothed belt, 4, the position of the rod, 86, is secured by blocking with the safety nut, 103.

The oil non-return device, 15 (FIGS. 11 and 12) the absorbent belt, 1, passes through, from the driving module "C" to the adjustment-and-pumping module "D", is provided with an oil recuperator, 104, fixed in the pins, 105, which are fixed in the hemi-cover 106, stacked over the hemi-cover, 107. The two hemi-covers, 106 and 107, close the belt oil non-return device, 15, at its upper end. The passage for the absorbent belt, 1, is separated by a metal sheet, 108, which is fixed on one hemi-cover.

The pump "E" (FIGS. 13 and 14) is a plunger-type and is driven by the pulley, 25, and fixed with the key, 109, on the shaft, 110, which is provided with the eccentric, 111, situated between the disk, 112, and the liner, 113, driven by the cross-pin, 114, placed on the roll bearings, 115, and, 116, on the liner? (case?), 117, through the covers, 118, and, 119. The plunger, 120, is guided by the baffle, 121, and the cylindrical volume made by the baffle, 123, fixed in the case, 123. The sealing on the plunger, 120, is of gland-type and is made of the rings, 124, the disk, 125, the spring, 126 and the cover, 127, pressed by the nuts, 124, screwed on the studs, 129. At the inferior part of the pump "E" there are situated the intake valve "o" and the discharge valve "p" which are linked to the active volume of the cylinder "r" through the box, 130. The intake valve "o" is made of the ball seating, 131, the ball, 132, the cage, 133, closed by the piece, 134, and the discharge valve "p" is made of the ball seating, 135, the ball, 136, and the cage, 137, enclosed by the case, 138. The case, 130, is closed with the plugs, 139, and, 140, plus the gaskets, 141, and, 142. The case, 138, of the discharge valve "p" is fitted to the box, 130, with the screws, 143. The screws, 144, fit together the intake flange, 145, the cage, 133, of the intake valve "o" and the cage, 130, on the liner, 117, of the pump "E". In order to empty the oil leakage from the annular space "s", there is placed the threaded plug, 145.

The active pumping stroke is generated by the eccentric, 111, on which is fitted the roll bearing, 146, and which pushes the plate, 147, fixed on the plunger, 120, and the come-back stroke is driven by the spring, 148, fitted between the cover, 121, and the plate, 147. The plunger stroke adjustment and, subsequently, the pump's flow rate is done through the rod, 149, which can shorten the stroke of the plunger, 120, to a lesser value that is twice the value of the disk, 111, eccentricity, and, proportionally, the pump's flow rate. The adjustment is performed with the micrometric system made of the sleeve, 150, coupled with the rod through the cross-pin, 151 and the piece, 152, fixed on the liner, 117, with the screws, 153.

The module "K" (FIGS. 1, 15, 16 and 17) from the down hole equipment, provided with the bottom pulley, 3, over which is looped the absorbent belt, 1, is composed of two pieces, 154, and 155, connected through the plates 156, and, 157 in which there are situated the covers, 158, and, 159 over which there is fixed the shaft, 160, connected to the bottom pulley, 3, through the roll bearings, 161, and, 162, separated by the baffle, 163. The fixing of the plates, 156, and, 157, over the pieces, 154, and, 155, is done with the screws, 164, and, 165, and the pins, 166, and, 167. The module "K" is fitted to the down hole equipment with the threads "t" and "u".

The expandable pads modules "L" and "M" (FIGS. 1, 18 and 19) of the down hole equipment "B" are made of the piece, 168, provided with the deep cuttings, "v" and "w" where there are placed the pads, 169, and, 170, each of these being expanded by several springs, 171. The pads path is limited by the plates, 173, two for each pad, fixed on the piece, 168, with the screws, 174. The two expandable pads modules "L" and "M" are fitted in the down hole equipment with the threads "x" and "y"

In order to prevent the piston effect during the operations of running in/pulling out the down hole equipment from the well, the piece, 168, is provided with the longitudinal gap "z"

What is claimed is:

1. An artificial oil lifting unit comprising:
    an endless olephilic absorbent belt;
    surface equipment; and
    down hole equipment, the absorbent belt driven by the surface equipment and tensed by the down hole equipment placed in a well production casing,
    wherein the said absorbent belt (1) is looped over a central pulley (2) from a driving and collecting module (C) and driven by a double toothed belt (4) looped over six pulleys from which five of the six pulleys are free (6,7,8,9 and 10) and one of the six pulleys is a driving pulley (5) placed over an entry shaft (36), and the double toothed belt (4) is also looped over the oil absorbent belt on the central pulley and tensed with two identical systems (I) with pulleys commanded from the exterior of a case (13).

2. An artificial oil lifting unit in accordance with the claim 1, wherein oil is pressed on the pulleys (5,6,7,8,9,10,11 and 12) from the oil absorbent belt (1) looped over the pulleys and finally collected from the belt with an oil recuperator (104) which collects the oil in a pool (c) in an inferior part of the case (13) near the driving and collecting module (C) and the oil is pumped at an oil gathering center with an oil transfer pump (E) integrated in the surface equipment (A) in an adjustment module (D).

3. The artificial oil lifting unit in accordance with claim 2, wherein the motion of the double toothed belt (4) which drives the oil absorbent belt (1) and the motion of the oil transfer pump (E) fixed on the adjustment module (D) is driven by an electromotor (19) through two transmission belts, the first transmission belt (21,22 and 23) being stretched from the electromotor to an entry shaft (36) of the oil absorbent belt (1) in the driving and collecting module (C) which is simple toothed, and the second transmission belt being stretched from the entry shaft (36) to the oil transfer pump (E) over two pulleys (23 and 25), the first pulley (23)

being situated on the entry shaft (36) and the second pulley being situated on the driving shaft (110) of the oil transfer pump (E).

4. An artificial oil lifting unit in accordance with claim 2, wherein the oil transfer pump (E) which pumps the oil from the unit to the oil gathering center is a plunger-type pump and is made of an eccentric (111) with the roll bearing (146) set on the shaft (110), a plunger (120) and a cylinder (122, 123), two ball valves (132, 136) both with a conical ball seating (131 and 135) set on the intake and, respectively, discharge pipes, the plunger (120) return stroke being ensured by a spring (148), and the plunger (120) stroke, and, subsequently, the oil transfer pump flow rate, being adjusted by a threaded rod (149) carried by a micrometrical system (150 and 152).

5. The artificial oil lifting unit in accordance with claim 1, wherein the double toothed belt (4) drives the oil absorbent belt and the double toothed belt (4) has, on its inner side teeth, of trapezoidal profile (d) which come in contact with the six pulleys (5,6,7,8,9 and 10) and has, on its outer side, teeth of special, rounded (semicircular) profile (e) which come in contact with the oil absorbent belt (1) at areas the oil absorbent belt is looped over the central pulley (2) and the adjacent pulleys (5 and 10) such that the outer side teeth drive the oil absorbent belt and through the inner side teeth (d) the double toothed belt is driven by the driving pulley (5) situated on the entry shaft (36) of the driving and collecting module (C).

6. The artificial oil lifting unit in accordance with claim 1, wherein the entry shaft (36) penetrates the case (13) having fitted on the end the driving pulley (5) in the case, wherein the driving pulley drives the double toothed belt (4) and is set on two roll bearings (43 and 44) in a bearing cage (45) fixed in the case (13) and inner sealed with baffles (39-49) and outer sealed with soft rings (52) pressed by a spring (53) over a cover (55) provided with a shoulder (g) which, in the case of an occurrence of gas overpressure from the well into the case (13), makes the soft rings (52) further press the spring (53), which increases the sealing efficiency on the entry shaft (36).

7. An artificial oil lifting unit in accordance with the claim 1, further comprising:
the pulleys (2,10,11 and 12) over which the oil absorbent belt (1) is looped, placed on bolts (58 and 69) sealed with baffles (64-66 and 71-72), and the oil squeezed from the oil absorbent belt (1) when this belt is pressed on the pulleys, is passed to the inner volume of the pulleys through the radial holes (h and j) and, from there the oil passes into the pool of the case (13), and the oil which passes through longitudinal holes (i and k) also passes to the pool.

8. An artificial oil lifting unit in accordance with claim 1, wherein a tension system (H) of a driving belt (24) of the oil transfer pump (E) is made of a pulley (73) set on roll bearings (75) on an arm (77) articulated on a bolt (78) fixed on the case (13) of the driving and collecting module (C) and a pressing arm (81) which is fixed with the screw (82) on a flattening (l) aligned with other flattenings (m) and situated in an area not reached by the pressing arm (81), the tension of the driving belt being realized by pushing the arm (77) with a screw (84) which passes through this arm.

9. An artificial oil lifting unit in accordance with claim 1, wherein a tension system (I) of the double toothed belt (4) is made of an arm (86) which is articulated, at one end, on the case (13), and at the other end is provided with a pressing pulley (7), the middle of the arm (86) being set on a threaded rod (90) which can be longitudinally slided by rotating a bell (96) which is elastically linked to a box (91) through springs (97), whose deformation is the value of the force applied on the arm rod, respectively on the pressing pulley (7).

10. An artificial oil lifting unit in accordance with claim 1, wherein the passage of the oil absorbent belt (1) from the driving and collecting module (C) into the adjustment module (D) of the surface equipment (A) is made through an oil non-return device fixed at the bottom of the case (13) and provided with two openings where both branches (ascending/descending) of the oil absorbent belt (1) pass through, and where the descending branch of the said absorbent belt is swept by a final recuperator (104) and, a metal sheet (108), which separates the area between the absorbent belt branches, is fixed over the oil non-return device (15) in a way that it prevents the migration of the oil brought by the ascending branch on the descending branch which returns to the well production casing.

11. An artificial oil lifting unit in accordance with claim 1, wherein a module (K) with a bottom pulley (3) from the down hole equipment (B) is made of two parts (154 and 155) having two covers (158 and 159) set between them, the covers bearing the bottom pulley (3) which is provided with guidings for the oil absorbent belt (1) made of lateral disks.

12. An artificial oil lifting unit in accordance with claim 1, further comprising:
expandable pads modules (L and M) provided with a piece (168) where two pads (169 and 170) pressed by springs (171) are set, the piece provided with a longitudinal gap (z) which prevents the occurrence of the piston effect during the operations of running in/pulling out the down hole equipment (B) in/from the well casing.

13. An artificial oil lifting unit, comprising:
an endless olephilic absorbent belt and a double toothed belt;
surface equipment, including a case, driving the absorbent belt;
down hole equipment tensing the absorbent belt; and
a driving and collecting module including a first pulley set of one or more pulleys over which only the absorbent belt is looped, a second pulley set of one or more pulleys over which only the double toothed belt is looped, and a third pulley set of one or more pulleys over which both the absorbent belt and the double toothed belt are looped;
wherein the third pulley set includes a central pulley.

14. The artificial oil lifting unit as set forth in claim 13, wherein the driving and collecting module is part of the surface equipment.

15. The artificial oil lifting unit as set forth in claim 14, wherein the third pulley set includes a drive pulley through which the surface equipment drives the absorbent belt.

16. The artificial oil lifting unit as set forth in claim 15, wherein the drive pulley also drives the double toothed belt.

17. The artificial oil lifting unit as set forth in claim 16, wherein:
one or more of the pulleys of the second pulley set are free pulleys that tension the double toothed belt and are connected to a tension system;
the tension system extends outside of the case; and
the tension of the double toothed belt is adjustable by controlling the tension system.

18. The artificial oil lifting unit as set forth in claim 16, wherein the driving and collecting module further comprises an oil recuperator in contact with a portion of the absorbent belt at a position interior to the case.

19. The artificial oil lifting unit as set forth in claim 18, wherein oil absorbed by the absorbent belt is pressed from the absorbent belt by the oil recuperator.

20. The artificial oil lifting unit as set forth in claim 16, wherein:

oil absorbed by the absorbent belt is pressed from the absorbent belt by one or more of the pulleys of the driving and collecting module; and the double toothed belt has a first side with teeth having a trapezoidal profile that come in contact with one or more pulleys of the second pulley set, and a second side with teeth having a rounded profile that come in contact with the absorbent belt.

21. The artificial oil lifting unit as set forth in claim 20, wherein:

the driving and collecting module that drives the drive pulley also drives the oil transfer pump, whereby the flow rate of the oil is synchronized with the speed of the absorbent belt.

22. The artificial oil lifting unit as set forth in claim 16, wherein:

oil which is collected from the absorbent belt pools inside the case;

the surface equipment further comprises an oil transfer pump that transfers the oil from the inside of the case to the outside.

\* \* \* \* \*